United States Patent
Vogety et al.

(10) Patent No.: US 9,014,102 B2
(45) Date of Patent: Apr. 21, 2015

(54) MOBILE ACCESS NODE CHANNEL SELECTION WITHIN A MESH NETWORK

(75) Inventors: Ramanagopal V. Vogety, Milpitas, CA (US); Cyrus Behroozi, Sunnyvale, CA (US); Amalavoyal Chari, Sunnyvale, CA (US)

(73) Assignee: ABB Inc., Cary, NC (US)

( * ) Notice: Subject to any disclaimer, the term of this patent is extended or adjusted under 35 U.S.C. 154(b) by 1787 days.

(21) Appl. No.: 11/407,801

(22) Filed: Apr. 20, 2006

(65) Prior Publication Data

US 2007/0248044 A1 Oct. 25, 2007

(51) Int. Cl.
*H04W 4/00* (2009.01)
*H04W 72/02* (2009.01)
*H04W 72/04* (2009.01)

(52) U.S. Cl.
CPC .......... *H04W 72/02* (2013.01); *H04W 72/0406* (2013.01)

(58) Field of Classification Search
CPC ....... H04W 4/02; H04W 36/32; H04W 24/02; H04W 28/0236; H04W 48/16; H04W 36/08; H04W 40/12; H04W 48/20; H04W 72/04; H04W 72/042; H04W 72/085; H04W 16/00; H04W 16/26; H04W 28/0231; H04W 28/0289
USPC ....................................................... 455/445
See application file for complete search history.

(56) References Cited

U.S. PATENT DOCUMENTS

| | | | |
|---|---|---|---|
| 5,471,469 A | 11/1995 | Flammer, III et al. | |
| 5,572,528 A | 11/1996 | Shuen | |
| 6,044,062 A | 3/2000 | Brownrigg et al. | |
| 6,097,703 A | 8/2000 | Larsen et al. | |
| 6,249,516 B1 | 6/2001 | Brownrigg et al. | |
| 6,493,377 B2 | 12/2002 | Schilling et al. | |
| 6,590,928 B1 | 7/2003 | Haartsen et al. | |
| 6,804,532 B1 * | 10/2004 | Moon et al. | 455/552.1 |
| 6,879,574 B2 | 4/2005 | Naghian et al. | |
| 2004/0029553 A1 * | 2/2004 | Cain | 455/403 |
| 2004/0171347 A1 | 9/2004 | Burton et al. | |
| 2004/0185887 A1 | 9/2004 | Wolman et al. | |
| 2004/0203787 A1 | 10/2004 | Naghian | |
| 2004/0252643 A1 * | 12/2004 | Joshi | 370/238 |
| 2005/0036487 A1 * | 2/2005 | Srikrishna | 370/389 |
| 2005/0058151 A1 | 3/2005 | Yeh et al. | |
| 2005/0063309 A1 | 3/2005 | Alich et al. | |
| 2005/0226179 A1 | 10/2005 | Behroozi et al. | |
| 2006/0116170 A1 * | 6/2006 | Brahmbhatt et al. | 455/560 |
| 2006/0217166 A1 * | 9/2006 | Swanson | 455/701 |
| 2006/0268727 A1 * | 11/2006 | Rangarajan et al. | 370/248 |

OTHER PUBLICATIONS

Al-Bin-Ali et al., An Inter-Access Point Handoff Mechanism for Wireless Network Management: The Sabino System, Computer Science Department, University of Arizona, Lancaster University.

* cited by examiner

*Primary Examiner* — Nimesh Patel
(74) *Attorney, Agent, or Firm* — Brian R. Short

(57) ABSTRACT

An apparatus and method of a mobile node selecting a transmission channel of a mesh network is disclosed. The method includes the mobile node detecting a quality of routing beacons received over a previously selected transmission channel. If the quality of the routing beacons is below a predetermined threshold, then the mobile node transmits probe requests on each of a plurality of available transmission channels. Responses to the probe request are collected from at least one upstream access nodes over at least one of the available transmission channels. A new transmission channel is selected based upon the responses received over the available transmission channels.

20 Claims, 7 Drawing Sheets

MOBILE ACCESS NODE CHANNEL SELECTION WITHIN A MESH NETWORK

FIELD OF THE INVENTION

The invention relates generally to wireless communications. More particularly, the invention relates to a method and apparatus of mobile access node transmission frequency selections for wireless connections to clusters of mesh networks.

BACKGROUND OF THE INVENTION

Packet networking is a form of data communication in which data packets are routed from a source device to a destination device. Packets can be networked directly between a source node and a destination node, or the packets can be relayed through a number of intermediate nodes.

A wireless network can include a wireless device being connected to a network through a base station that is wired to the network. The wireless device can transmit data packets that are received by the base station and then routed through the network. The wireless network can include many base stations that are each wired to the network.

FIG. 1 shows a prior art mesh network that includes a gateway 110 connecting a client device 140 to a network (internet) 100 through fixed access nodes 120, 130. The connections between the gateway 110 and the access nodes 120, 130 can be wireless. Additionally, the connection between the access nodes 120, 130 and the client 140 can be wireless. Wireless connections typically are subject to conditions that can make the connections unreliable. Such conditions include fading, multi-path and signal interference.

Some mesh networks can additionally include mobile access nodes that physically change their location over time. Mobile access nodes add another layer of complexity because typically optimal routes continually change for mobile access nodes. Therefore, the routing selection for a mobile access node is more complex than the routing selection for a fixed access node.

Mesh networks can additionally include multiple transmission channels, in which access nodes must select the best transmission channel. The changing physical location of mobile access nodes typically requires the mobile access nodes to select the best transmission channel. Transmission channel selection can be required to be completed while the mobile access node is connected to the mesh network.

It is desirable to have a wireless mesh network that includes fixed and mobile access nodes. It is desirable that mobile access nodes continually analyzes the quality of transmission links and transmission frequencies of the mesh network, and select an optimal transmission frequency from among all available transmission frequencies.

SUMMARY OF THE INVENTION

One embodiment of the invention includes a method of an access node selecting a transmission channel. The method includes the mobile access node detecting a quality of routing beacons (or quality of a routing path) received over a previously selected transmission channel. If the quality of the routing beacons (routing path) is below a predetermined threshold, then the mobile access node transmits probe requests on each of a plurality of available transmission channels. Responses to the probe request are collected from at least one upstream access node over at least one of the available transmission channels. A new transmission channel is selected based upon the responses received over the available transmission channels.

Another embodiment of the invention includes a method of selecting transmission channels through a mesh network, wherein the mesh network includes mobile and fixed access nodes. The method includes a plurality of gateways originating and broadcasting routing beacons, each gateway broadcasting on one of a plurality available transmission frequencies. Each mobile node detects a quality of routing beacons received over a previously selected available transmission channel. If the quality of the routing beacons is below a predetermined threshold, then the mobile transmits probe requests on each of the available transmission channels. Responses to the probe request are collected from upstream access nodes over each of the available transmission channels. A new transmission channel is selected based upon the responses received over the available transmission channels.

Other aspects and advantages of the present invention will become apparent from the following detailed description, taken in conjunction with the accompanying drawings, illustrating by way of example the principles of the invention.

DETAILED DESCRIPTION

Figure 1:
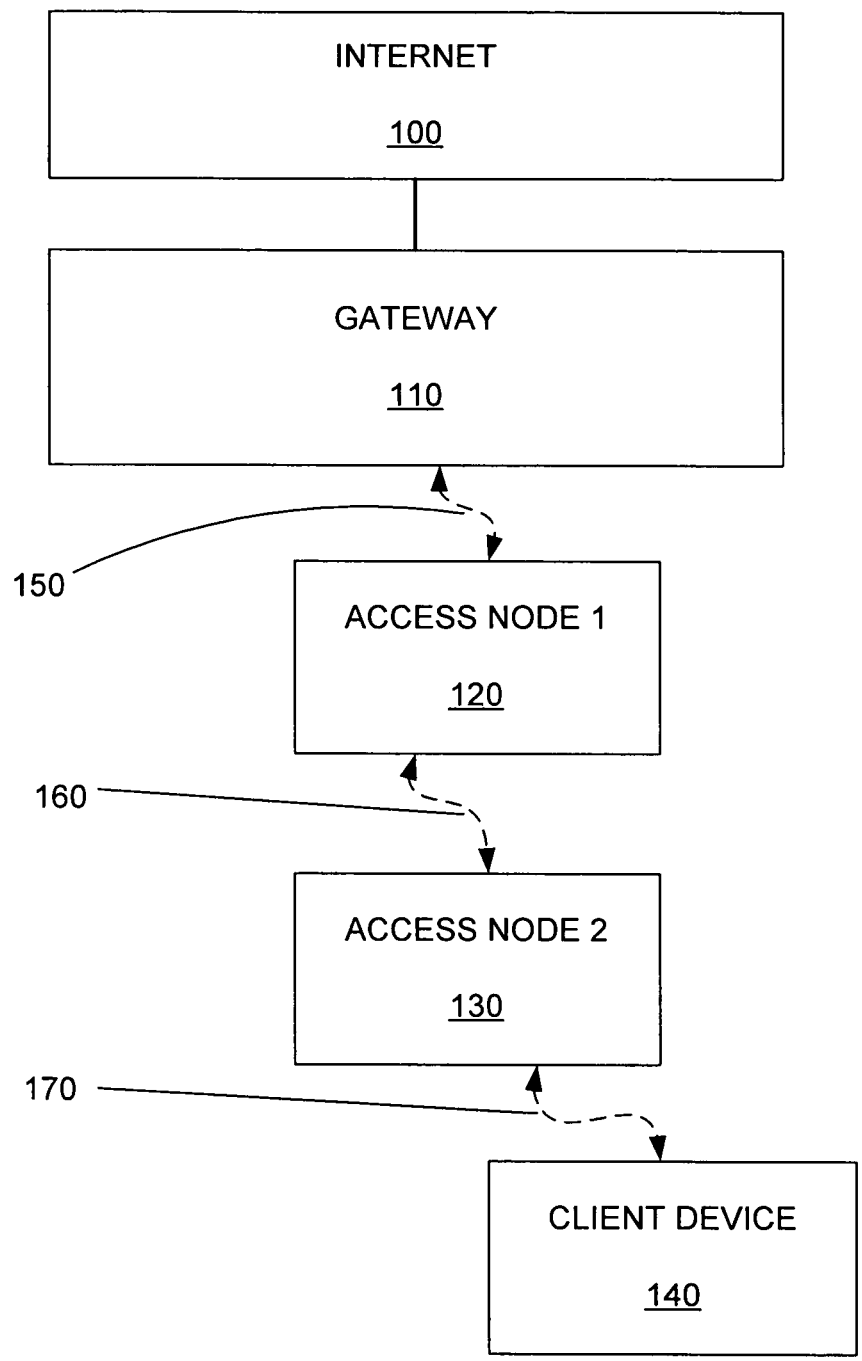
FIG. 1 shows a prior art mesh network.

As shown in the drawings for purposes of illustration, the invention is embodied in an apparatus and method for mobile access nodes analyzing a quality of available transmission frequencies of a wireless network that includes fixed access nodes and mobile access nodes, and selecting an optimal transmission frequency from among all available transmission frequencies.

Mobile access nodes can be used to extend the coverage area afforded by the fixed access nodes. In addition, mobile access nodes can also provide network connectivity to client devices which are either wireless-enabled or are directly plugged into an Ethernet port on the mobile access node. Mobile access nodes can connect wirelessly to the mesh network and join it through fixed or mobile access nodes.

Fixed access nodes are typically mounted on streetlights, utility poles, cable strands and the like. An embodiment of mobile access nodes are designed to be mounted inside an automobile, typically in the trunk, and drawing power from the battery of the automobile. Fixed access nodes can connect together wirelessly to form a mesh network that provides coverage to wireless client devices such as laptops or PDAs equipped with wireless radios. A fraction of the fixed access nodes can have provisioned backhaul over fiber or Ethernet or WiMax or other point-to-point or point-to-multipoint wireless backhaul.

Figure 2:
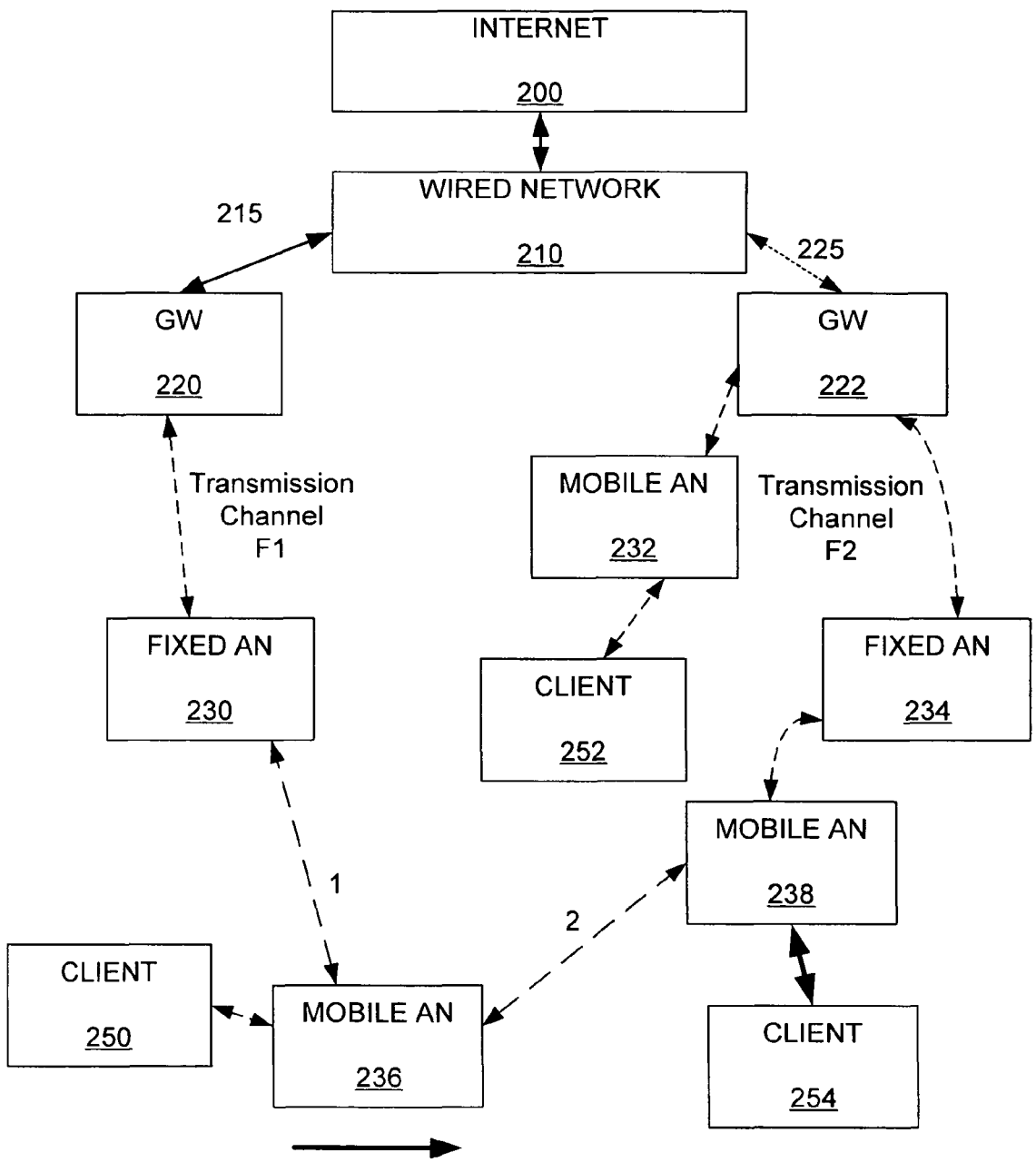
FIG. 2 shows a wireless network that includes fixed access nodes and mobile access nodes wirelessly connected to gateways, in which each gateway forms a cluster having a specified transmission frequency.

FIG. 2 shows a wireless mesh network that includes fixed access nodes and mobile access nodes. The wireless mesh network includes gateways 220, 222. The gateways 220, 222 are connected to a wired network 210. The gateways 220, 222 can be either wired or wirelessly connected to the wired network 210. The wired network 210 can be connected to the internet 200. As will be described later, the gateways originate routing beacons (packets) at a predetermined rate, and at a predetermined transmission frequency.

Clusters

Each of the gateways 220, 222 defines a cluster. A cluster includes the corresponding gateway, and all access nodes connected to the wired network 210 through the corresponding gateway. For various reasons, it can be desirable for each cluster to operate over a single, identified transmission frequency. For example, a first cluster of the gateway 220 can have a pre-selected transmission frequency of F1, and a second cluster of the gateway 222 can have a pre-selected transmission frequency of F2. The single, identified transmission frequency can be different than the transmission frequencies of other proximate clusters. This can be desirable to minimize interference between proximate clusters. Additionally, operating gateways and access node over a single transmission frequency enables the gateways and access node to have a single radio. For obvious reasons, a single radio access node is less expensive than a multiple radio access node. If the wireless connections between the gateways and access nodes of the mesh network are operating according to the 802.11 protocol, each cluster can be configured to operate on one of the available 802.11 transmission channels.

The mesh network further includes access nodes 230, 232, 234, 236, 238. The access nodes can include fixed access nodes 230, 234 and mobile access nodes 232, 236, 238. The fixed access nodes 230, 234 remain in a relatively stable location with respect to the rest of the network. The mobile access nodes 232, 236, 238 can move their locations with respect to the rest of the network. Each access node, whether fixed or mobile, transmits at the frequency of the cluster (as defined by gateways) that includes the access node.

Clients 250, 252, 254 can be wired or wirelessly connected to the access nodes 230, 232, 234, 236, 238. A shown in FIG. 2, a first client 250 is wirelessly connected to the mobile access node 236, a second client 252 is wirelessly connected to the mobile access node 232, and a third client 254 is wire connected to the mobile access node 238.

Allowing mobile access nodes to move relative to the rest of the mesh network requires the mesh network to be dynamic. The transmission frequency selections and routing selections between gateways and mobile access nodes should be continually monitored and if needed, reselected. Additionally, mobile access nodes and clients should be able to move within the network without the clients being required to carry special hardware or software.

Single Radio Access Nodes

One implementation of the access nodes includes a single radio. A single radio implementation is less expensive than a multiple radio implementation of the access nodes, but also causes some alternate and additional challenges not faced by a multiple radio network. For example, a single radio implementation forces time division multiplexed communication between the access nodes. It is generally more difficult to monitor link quality and maintain data transmission with a single radio.

Another advantage to operating different clusters at different transmission frequencies is the minimization of interference between access nodes of the mesh network.

Mobile Node Roaming

Assuming clusters of a mesh network each operate at different transmission frequency, then a mobile access node that roams from one cluster to a neighboring cluster should change its transmission frequency to match the transmission frequency of the cluster that offers the best wireless connection to a gateway. That is, a mobile access node may be proximate to several different clusters, but one of the clusters will typically provide the best network connection. As the mobile access node moves, the cluster offering the best network connection typically changes. Because the different clusters can have different transmission frequencies, the mobile access node must change its transmission frequency as cluster the mobile access node is connected to changes. For example, as the mobile access node 236 moves from being proximate to the first cluster to being proximate to the second cluster, it should desirably change its transmission frequency from F1 to F2. Several factors, as will be described, can be used to evaluate the quality of connection to each available cluster. Additionally, implementing the mobile access node with a single radio adds additional complexity to the monitoring and selecting of the cluster, and corresponding transmission frequency.

New channel selection process desirably does not interfere with an established network connection. That is, the mobile access node may be connected and be communicating with the network while roaming to a different cluster. Therefore, the channel selections should be made with minimal interference with the network connection. Again, if the mobile access node includes a single radio, the selection is more complex.

Figure 3:
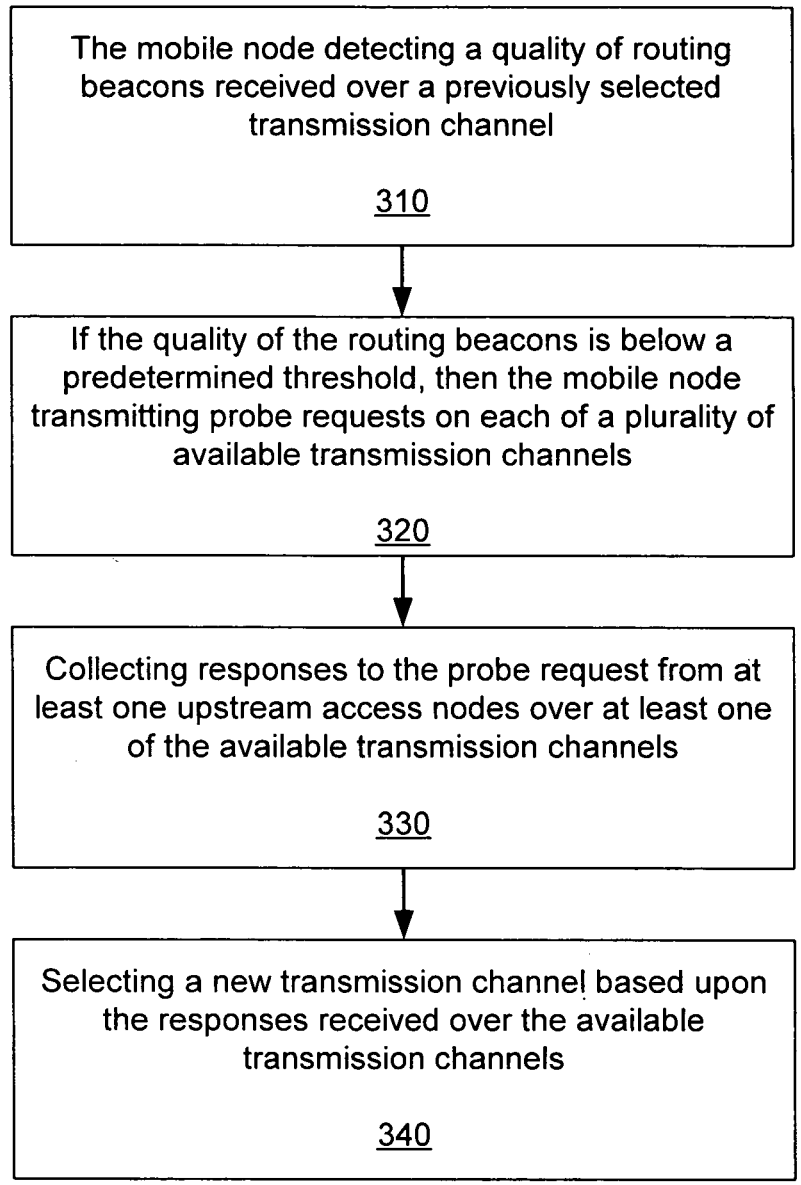
FIG. 3 is a flow chart that includes steps of one example of a method of mobile node transmission channel selection.

FIG. 3 is a flow chart that includes steps of one example of a method of mobile node transmission channel selection. A first step 310 of the method includes the mobile node detecting a quality of routing beacons received over a previously selected transmission channel. This can be generalized as detecting a quality of a routing path over a previously selected transmission channel. That is, the path quality can be detected in other ways than by routing beacon quality. If the quality of the routing beacons (routing path) is below a predetermined threshold, then a second step 320 includes the mobile node selecting at least one of a plurality of available transmission channels. A third step 330 includes the mobile node transmitting probe requests on each of the available transmission channels. A fourth step 340 includes collecting responses to the probe request from upstream access node over each of the available transmission channels. A fifth step 350 includes selecting a new transmission channel based upon the responses received over the available transmission channels.

The methods of transmission channel selection are described with respect to mobile access node. However, the methods of transmission channel selection can also be utilized by fixed access nodes as well.

Routing Beacon Quality

Each gateway originates routing beacons (also referred to as routing packets) which are used to select routing paths between the gateway and each access node within the cluster defined by the gateway. Each access node receives routing beacons from upstream devices (the gateway or other access nodes) and selects an upstream device depending upon the quality of the received beacons. Each access node modifies and rebroadcasts the routing beacons of the selected upstream devices. The mobile access nodes select routing paths is essentially the same manner. That is, the mobile access nodes select routing paths through a cluster based upon the quality of the received routing beacons. An exemplary quality parameter includes a persistence of the received routing beacons. That is, the number of received routing beacons received over a period of time.

If the quality (for example, persistence) of the received routing beacons falls below a predetermined threshold, the mobile access node can use this knowledge to check to determine whether another cluster at a different transmission frequency provides a better network connection. That is, as the mobile access node moves, the network connection provided by a present cluster may become inferior to a network connection provided by a neighboring cluster. One way to detect this condition is to monitor the quality of the routing beacons received from the present cluster at the transmission frequency of the present cluster.

Selecting One of Available Transmission Channels

When the quality of the routing beacons falls below the predetermined threshold, the mobile access node selects a different transmission frequency to determine whether a different cluster operating at a different transmission frequency may provide a better network connection. Generally, there are only a finite number of transmission channels available. The mobile access node can tune to the available channels and test the quality of available network connections. Based upon the tests, the mobile access node can select a new transmission channel of a new cluster. One embodiment includes the available channels being defined by the 802.11 protocol.

Mobile Node Transmitting Probe Requests

As previously mentioned, the testing of available channels for a better network connection should take as little time as possible to minimize the impact upon a connection of the mobile access node to the network. An embodiment includes the mobile access node transmitting probe requests over the available transmission channels. One example of a specific embodiment includes the probe requests defined by the IEEE 802.11 protocol. That is, probe requests transmitted by clients and responded to by access nodes are defined by the IEEE 802.11. These defined processes can be enhanced with vendor specific information elements included within the probe requests and probe responses.

All neighboring clusters that have transmission frequencies included within the defined available transmission frequencies can receive the probe requests.

Collecting Responses to the Probe Request

After the probe requests have been transmitted over the available transmission frequencies, the mobile access node collects all responses to the probe requests. All of the access nodes of the clusters that receive the probe requests respond. The number of responses and signal quality characteristics of the responses can be monitored by the mobile access node. Based upon the number and quality of the responses, a new transmission channel corresponding with a particular new cluster can be selected.

The number of responses received can provide an indication of how many of the probe requests were received by the cluster corresponding with the transmission frequency of the probe request. The number of responses can also provide an indication of how many of the access nodes within the corresponding cluster received the probe requests. Both of these factors can be helpful in deciding which transmission frequency is selected.

The quality of the responses provides some indication of the quality of the wireless connection of the mobile access node to the cluster at the selected transmission frequency. This also can be helpful in deciding which transmission frequency is selected. An exemplary response quality that can be measured/monitored by the mobile access node includes a receive signal strength indicators (RSSI) which provides an indication of the signal strength of the received response. Other embodiment include measuring the SNR (signal to noise ratio) of the response. Other user defined configurable preferences can additionally be included. For example, mobile nodes can preferably route through fixed nodes rather than mobile nodes, and therefore, preferably select a transmission frequency of a fixed node over a transmission frequency of a mobile node.

As will be described, other parameters can be used for selecting a cluster and corresponding transmission frequency. For example, the quality of routing paths within the clusters can be additionally used to select a cluster and corresponding transmission frequency. Each access node within a cluster has a path quality that can be determined by the quality of routing beacons received by the access node through the cluster from the routing beacon originating gateway. This path quality provides an indication of the quality of the path the mobile access node would have if the mobile node was connected to the cluster through the access node of the cluster. By knowing the path quality of the connections to the corresponding gateways of the clusters having the transmission frequencies being tested, the mobile access node can make a more intelligent decision about which cluster the mobile access node should connect to. That is, beyond the number of responses received and the quality of the response, the path quality of the connections to each available gateway can be used to select the most desirable cluster and corresponding transmission frequency.

Another embodiment includes other information parameters of the response being used to influence selection of the new cluster. For example, a client may preferentially select a network have a particular network identifier.

Selecting a New Transmission Channel Based On the Responses

Once the responses have been received, a new transmission channel is selected. Many different combinations of the parameters of the responses can be used in the selection. As described, the selection can be based on the number of response and the signal quality of the responses. Additionally, path qualities of the connections to the gateways of the cluster can be used, and preferences of access nodes of particular service providers can be used, in the cluster and transmission frequency selection.

Selecting a New Transmission Frequency Based on Beacon Reception

Figure 4:
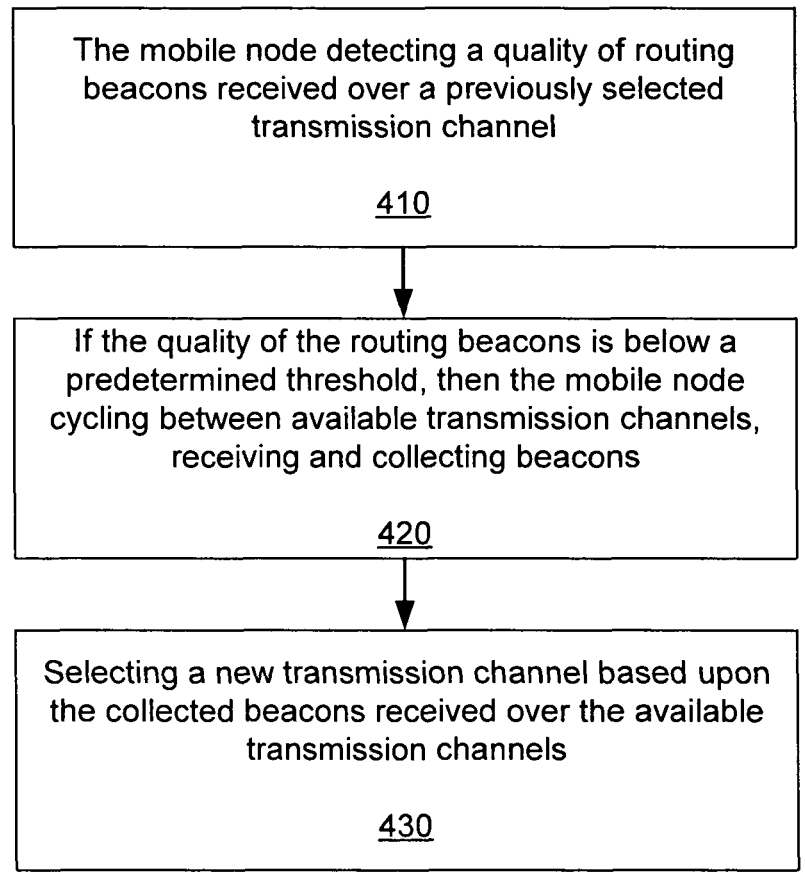
FIG. 4 is a flow chart that includes steps of one other example of a method of mobile node transmission channel selection.

FIG. 4 is a flow chart showing steps of another method of a mobile node transmission channel selection. A first step 410 includes the mobile node detecting a quality of routing beacons received over a previously selected transmission channel. If the quality of the routing beacons is below a predetermined threshold, then a second step 420 is executed that includes the mobile node cycling between available transmission channels, receiving and collecting beacons transmitted by other clusters. A third step 430 includes selecting a new transmission channel based upon the collected beacons received over the available transmission channels.

The beacons are used to estimate a quality of a transmission link between the transmitting access node and the mobile access node. Examples of beacons that can be used include 802.11 beacons, and routing beacons (packets) of a wireless mesh network as will be described.

Embodiments of the access node can include single or multiple radios. If the access node includes a single radio, then the reception of beacons over other available transmission channels from other clusters occurs through the single radio while the single radio is also transmitting data packets.

This can happen, for example, by time multiplexing the data packet transmission with the cycling between transmission channels. That is, the mobile access node cycles between the transmission channels while transmitted data packets over the previously selected transmission channel. For multiple radio access nodes, the reception of beacons over other available transmission channels can occur over a first radio simultaneous with data packet transmission through a second radio.

The received beacons are transmitted from neighboring clusters. Therefore, the access node can monitor the quality of network connections to cluster other than the cluster the access node is presently connected to.

Routing Selections through Clusters

Figure 5:
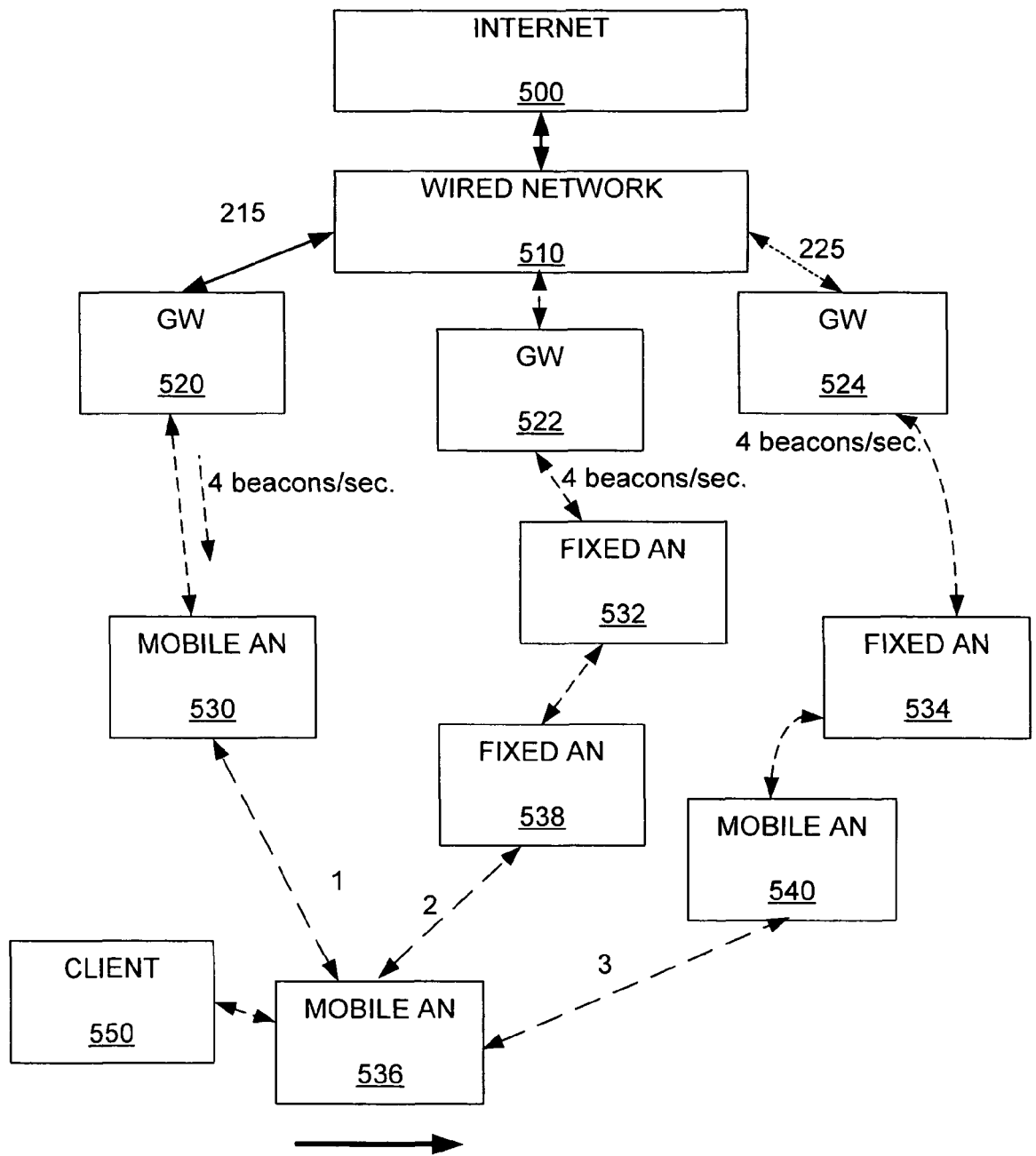
FIG. 5 shows a mesh network that includes several clusters, in which the clusters include access nodes having routing paths to gateways of the clusters.

FIG. 5 shows a mesh network that includes several clusters, in which the clusters include access nodes having routing paths to gateways of the clusters. Each access node within each cluster selects a routing path to the gateway within the cluster.

Access nodes 530, 532, 534, 536, 538, 540 (both fixed access nodes and mobile access nodes) are coupled either directly or indirectly to the gateways 520, 522, 524. That is, each access node is either directly connected to an upstream gateway 520, 522, 524 or indirectly connected through another access node to at least one of the upstream gateways 520, 522, 524. The decision of which access nodes or gateways each access node is connected, can include many factors. The network of FIG. 5 can include any number of additional gateways and access nodes. As shown in FIG. 5, a client 550 can obtain access to the network by establishing a connection to an available access node, such as, access node 536.

Gateways 520, 522, 524 broadcast routing packets (beacons), which can be used to determine routing between access nodes 530-540 and gateways 520, 522, 524 of the network. The beacons are received by all first-level access nodes (for example, fixed and mobile access nodes 530, 532, 534), which are access nodes that are able to receive gateway transmitted beacons, and directly route data through to a gateway. For an exemplary embodiment, the beacons originate at the gateways 520, 522, 524 at a predetermined rate. For example, FIG. 5 depicts routing beacons being originated at the gateway 520 at a rate of 4 routing beacons per second. The first-level access nodes can measure the quality of the link between them and the gateways by comparing the number of routing beacons received over a period of time with the total number of beacons transmitted over the period of time. For example, the first-level access nodes can count the number of beacons received over a ten second period. This number can be compared with the number transmitted (40) over the ten second period to determine the quality of the link between the first-level access node and the transmitting gateway.

The beacons are used to establish a route from each access node to a gateway. The first-level access nodes re-broadcast the routing beacons, attaching their own information to the routing beacons. The first-level access nodes maintain the routing beacon transmission rate as determined by the gateways. That is, the gateways transmit the routing beacons at a rate of four per second, and the first-level access nodes re-broadcast the modified routing beacons at the same rate at which routing beacons are successfully received by the access nodes. This allows the second-level access nodes to measure the path quality between them and the gateways. The first level access nodes re-broadcast the beacons after adding first level access node information, such as the address of the first level access node. First level access nodes can be fixed access nodes or mobile access nodes. It is to be understood that there can be any number of mobile and fixed access nodes any number of hops away from a gateway.

Mobile Access Node Routing Selections

Due to their mobility, the transmission links of mobile access nodes are likely to change more rapidly than the transmission links of fixed access nodes. Therefore, the quality of selected routes (and non-selected routes) is likely to change more rapidly than fixed access nodes. As a result, the routing selections of the mobile access nodes should occur more often, and place a greater weight on routing beacons most recently received.

An example of how a mobile access node selects an upstream routing path includes the mobile access nodes receiving routing packets (routing beacons) from at least one upstream access node. As described, the routing packets including information of at least one upstream access node along a path to a gateway access node. The mobile node assigns a weight to each received routing packet, in which the weight is dependent on how recently the routing packet is received. The mobile node calculates a packet success rate for each upstream link by summing routing packets weights over a period of time for each upstream link. The mobile node selects a routing path through at least one upstream access node based upon the packet success rate of routing packets received from each upstream access node.

An additional packet success rate calculation can include dividing the summed routing packet weight by a maximum possible number possible for the sum.

The routing selections can be based at least in part upon short and long routing packet success rates. For example, a short test can be used to determine whether a link is alive. A long test can include beacons received over a longer period of time, and aid in the routing selections. For example, the short test can buffer (receive and store) ten seconds worth of received routing beacons, and a long test can buffer additional routing beacons for a total time of 40 seconds. The maximum number of beacons that can be received is set by the rate (for example, four routing beacons per second) and the period of time of reception. For fixed nodes, a routing selection typically includes counting the number of routing packets received through each upstream link, and determining the best link based on this number. As described, mobile access nodes weight the routing beacons to additionally influence the routing selections based upon when the beacons were received. Typically, the mobile access nodes perform the long and short test more frequently than the fixed access node because of their mobility.

As will be described, mobile nodes prefers to select an upstream route through a fixed access node, but will select an upstream route through another mobile access node if the upstream mobile access node has a link quality a predetermined amount greater than the link quality of any fixed access node.

Due to the potential mobility of mobile access nodes, an embodiment includes preventing fixed nodes from ever selecting a link through an upstream mobile node. That is, fixed access nodes only select links and routing paths through upstream fixed nodes.

As previously described, the beacons are used to establish a route from each access node to a gateway. The first level access nodes re-broadcast the beacon data, attaching their own information to the beacon. The information indicates to the second level access nodes that the path to the gateway includes the first level access node. As each access node rebroadcasts the beacons, each access node adds additional information. The rebroadcast information can include the addresses of all upstream access nodes along the path to the gateway access node. That is, an embodiment includes each access node that receives routing beacons, modifying the routing beacons of a selected route by attaching an address of the access node, and re-broadcasting the modified beacons. The address can be an IP address of the access node or a MAC address of the access node. Other information can include an indication that the routing packet is being re-broadcast by a mobile access node, a current packet success rate, or a reverse link success rate.

For one embodiment, the link quality of the beacon received determines whether that beacon is rebroadcast by the access node. If the quality of the beacon is the best of all received beacons, it is rebroadcast. The beacons can be used to determine the quality of the link in both an upstream (towards a gateway) direction, and in a downstream (away from a gateway) direction. The upstream and the downstream link qualities can be used by each access node to select the best data routing path to a gateway. The link qualities can be influenced by other wireless transmission factors such as interference, noise and fading. Typically, the link qualities vary more for mobile access nodes than for fixed access nodes. The link qualities can be determined be calculating the percentage of beacons that are transmitted and successfully received. The link qualities can alternatively be determined by measuring a PER, BER or SNR of received routing beacons.

The routing packets can be designated as beacons, and include routing information. The beacons can be transmitted according to an 802.11 protocol. Any of the access nodes are operable as gateways as well.

If the mobile access node includes more than a single radio, then one radio can be connected to the network while another radio is determining routing beacon qualities of other available transmission channels of other neighboring clusters. The transmission frequency and cluster selection can occur in parallel with the network connection. However, even with more than one radio, the previously described methods of transmission channel selection can be desirable due efficiency in the transmission channel selection.

Figure 6:
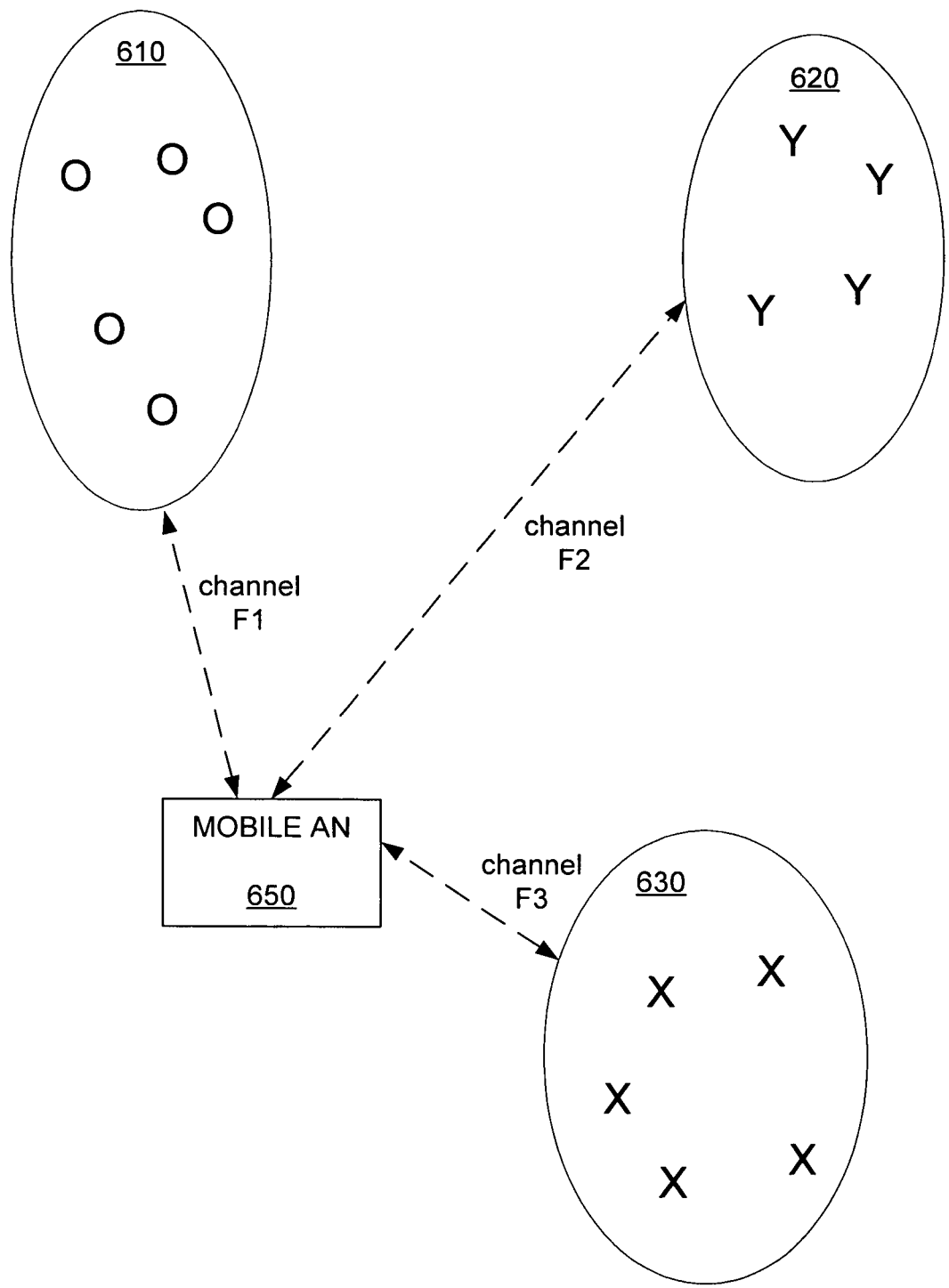
FIG. 6 shows several clusters in which each cluster includes multiple types of access nodes.

FIG. 6 shows several networks in which each network includes multiple access nodes. For this embodiment, each network includes a separate network identifier. A first network 610 includes a transmission frequency of F1, a second network 620 includes a transmission frequency of F2, and a third network 630 includes a transmission frequency of F3. Access nodes within the networks 610, 620, 630 have been designated as an O, Y or X depending upon the network identifier of the access node. A mobile access node 650 that is accessing one of the networks 610, 620, 630 over the available transmission frequencies F1, F2, F3 can preferentially select the network that includes a preferred network identifier. The transmission channel selection can include measuring/monitoring the number of response received from an access node of a network having the preferred network identifier, the quality of the responses received from the preferred access node, and the quality of the paths of the access node to a gateway.

Figure 7:
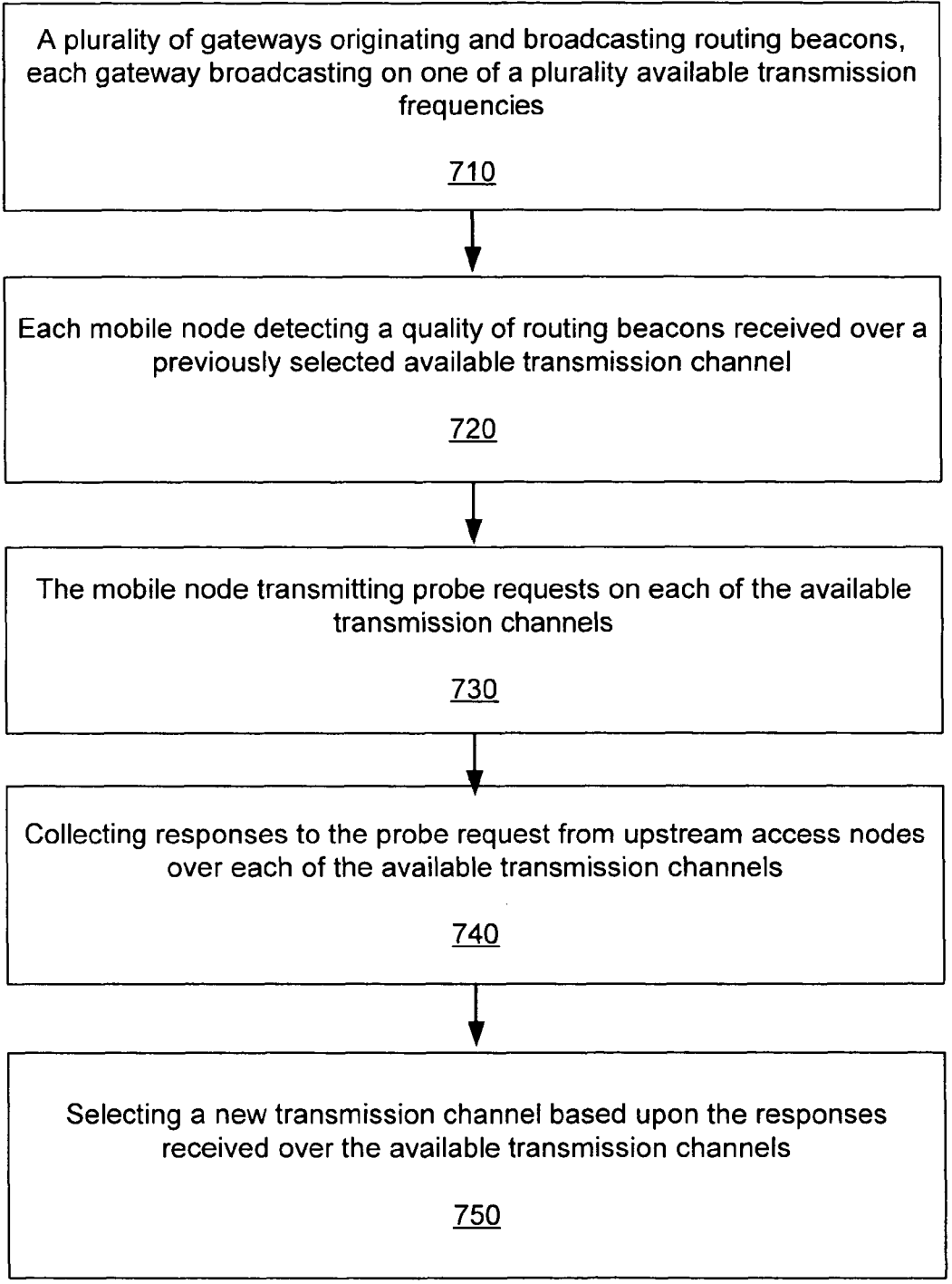
FIG. 7 is a flow chart showing an exemplary method of selecting transmission channels through a mesh network.

FIG. 7 is a flow chart showing an exemplary method of selecting transmission channels through a mesh network, wherein the mesh network includes mobile and fixed access nodes. A first step 710 includes a plurality of gateways originating and broadcasting routing beacons, each gateway broadcasting on one of a plurality available transmission frequencies. A second step 720 includes each mobile node detecting a quality of routing beacons received over a previously selected available transmission channel. If the quality of the routing beacons is below a predetermined threshold, then a third step 730 includes the mobile node transmitting probe requests on each of the available transmission channels. A fourth step 740 includes collecting responses to the probe request from upstream access nodes over each of the available transmission channels. A fifth step 750 includes selecting a new transmission channel based upon the responses received over the available transmission channels.

The methods of selecting transmission frequencies can be implemented as software operating on a mobile access node. The software programably operates the mobile access node to select a transmission frequency as has been described.

Although specific embodiments of the invention have been described and illustrated, the invention is not to be limited to the specific forms or arrangements of parts so described and illustrated. The invention is limited only by the appended claims.

What is claimed:

1. A method of a mobile node transmission channel selection, comprising:
   the mobile node detecting a quality of previously selected routing path over a previously selected transmission channel;
   if the quality of the routing path is below a predetermined threshold, then the mobile node transmitting probe requests on each of a plurality of available transmission channels;
   collecting responses to the probe request from at least one upstream access nodes over at least one of the available transmission channels, wherein the responses received from the at least one upstream access node over the at least one available transmission channel comprise a quality indicator of a routing path to at least one gateway;
   selecting a new transmission channel based upon the responses received over the available transmission channels, wherein selecting a new transmission channel further comprises comparing the quality indicator of each path corresponding to each transmission channel of responding upstream access nodes;
   wherein the mobile node comprises multiple radios and the new transmission channel selection is run by a second radio while a first radio is transmitting and receiving data with an upstream access node.

2. The method of claim 1, wherein the quality of the routing path is determined by monitoring a percentage of routing beacons that are successfully received over the previously selected transmission channel.

3. The method of claim 1, wherein the previously selected transmission channel is maintained if the quality of the routing path is above the predetermined threshold.

4. The method of claim 1, wherein selecting a new transmission channel based upon the response received over the available transmission channels comprises:
   determining how many upstream access nodes responded to the probe requests.

5. The method of claim 1, wherein selecting a new transmission channel based upon the response received over the available transmission channels comprises:
   measuring signal characteristics of the responses to the probe requests.

6. The method of claim 5, wherein measuring the signal characteristics of the responses includes determining a received signal strength indicator.

7. The method of claim 5, wherein measuring the signal characteristics of the responses includes determining signal to noise ratio SNR of the responses.

8. The method of claim 1, wherein the at least one gateway originates routing beacons.

9. The method of claim 1, wherein the quality indicator of each responding access node is based upon a persistence of routing packets at the responding upstream access node.

10. The method of claim 1, wherein the probe request includes a preferential information element that serves as a network identifier that can influence selecting a new transmission channel.

11. The method of claim 10, wherein the preferential information element comprises a preference to select the new transmission channel corresponding with a particular network identifier.

12. The method of claim 1, wherein the mobile node comprises a single radio that can transmit over multiple available transmission channels.

13. A method of selecting transmission channels through a mesh network comprising mobile and fixed access nodes, comprising:
   a plurality of gateways originating and broadcasting routing beacons, each gateway broadcasting on one of a plurality of available transmission frequencies;
   each mobile node detecting a quality of routing beacons received over a previously selected available transmission channel;
   if the quality of the routing beacons is below a predetermined threshold, then the mobile node initiating selection another of the plurality of available transmission channels;
   the mobile node transmitting probe requests on each of the available transmission channels;
   collecting responses to the probe request from upstream access nodes over each of the available transmission channels, wherein the responses received from the at least one upstream access node over the at least one available transmission channel comprise a quality indicator of a routing path to at least one gateway;
   selecting a new transmission channel based upon the responses received over the available transmission channels, wherein selecting a new transmission channel further comprises comparing the quality indicator of each path corresponding to each transmission channel of responding upstream access nodes;
   wherein the mobile node comprises multiple radios and the new transmission channel selection is run by a second radio while a first radio is transmitting and receiving data with an upstream access node.

14. The method of claim 13, wherein the previously selected transmission channel is maintained if the quality of the routing beacons is above the predetermined threshold.

15. The method of claim 13, wherein selecting a new transmission channel based upon the response received over the available transmission channels comprises:
   determining how many upstream access nodes responded to the probe requests.

16. The method of claim 13, wherein selecting a new transmission channel based upon the response received over the available transmission channels comprises:
   measuring signal characteristics of the responses to the probe requests.

17. A mobile node of a wireless mesh network, the mobile node configured to:
   detect a quality of previously selected routing path over a previously selected transmission channel;
   transmit probe requests on each of a plurality of available transmission channels if the quality of the routing path is below a predetermined threshold;
   collect responses to the probe request from at least one upstream access nodes over at least one of the available transmission channels, wherein the responses received from the at least one upstream access node over the at least one available transmission channel comprise a quality indicator of a routing path to at least one gateway; and
   select a new transmission channel based upon the responses received over the available transmission channels, wherein selecting a new transmission channel further comprises comparing the quality indicator of each path corresponding to each transmission channel of responding upstream access nodes;
   wherein the mobile node comprises multiple radios and the new transmission channel selection is run by a second radio while a first radio is transmitting and receiving data with an upstream access node.

18. The mobile node of claim 17, wherein the quality of the routing path is determined by monitoring a percentage of routing beacons that are successfully received over the previously selected transmission channel.

19. The mobile node of claim 17, wherein the previously selected transmission channel is maintained if the quality of the routing path is above the predetermined threshold.

20. The mobile node of claim 17, wherein selecting a new transmission channel based upon the response received over the available transmission channels comprises:
   determining how many upstream access nodes responded to the probe requests.

* * * * *